United States Patent
Kobayashi et al.

(10) Patent No.: US 9,375,639 B2
(45) Date of Patent: Jun. 28, 2016

(54) IMAGE DISPLAY SYSTEM AND HEAD-MOUNTED DISPLAY DEVICE

(71) Applicant: Seiko Epson Corporation, Tokyo (JP)

(72) Inventors: Shinichi Kobayashi, Azumino (JP); Atsunari Tsuda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 129 days.

(21) Appl. No.: 14/176,733

(22) Filed: Feb. 10, 2014

(65) Prior Publication Data

US 2014/0256429 A1 Sep. 11, 2014

(30) Foreign Application Priority Data

Mar. 11, 2013 (JP) ................. 2013-048246

(51) Int. Cl.
*A63F 9/00* (2006.01)
*A63F 13/98* (2014.01)

(52) U.S. Cl.
CPC ........... *A63F 13/02* (2013.01); *A63F 2300/203* (2013.01); *A63F 2300/301* (2013.01); *A63F 2300/303* (2013.01); *A63F 2300/308* (2013.01)

(58) Field of Classification Search
None
See application file for complete search history.

(56) References Cited

U.S. PATENT DOCUMENTS

| | | | | | |
|---|---|---|---|---|---|
| 5,526,184 | A | * | 6/1996 | Tokuhashi | G02B 27/0172 359/489.07 |
| 5,579,026 | A | * | 11/1996 | Tabata | G02B 27/017 345/649 |
| 6,292,158 | B1 | | 9/2001 | Amafuji et al. | |
| 6,377,230 | B1 | * | 4/2002 | Yamazaki | A63F 13/02 345/5 |
| 6,747,612 | B1 | | 6/2004 | Knox | G02B 27/0101 345/102 |
| 2004/0103111 | A1 | * | 5/2004 | Miller et al. | 707/102 |
| 2007/0247457 | A1 | * | 10/2007 | Gustafsson | F41G 1/00 345/420 |
| 2008/0204361 | A1 | * | 8/2008 | Scales et al. | 345/8 |
| 2010/0240988 | A1 | * | 9/2010 | Varga | G02B 27/017 600/425 |
| 2011/0249122 | A1 | * | 10/2011 | Tricoukes et al. | 348/158 |
| 2012/0092328 | A1 | * | 4/2012 | Flaks et al. | 345/419 |
| 2012/0105473 | A1 | * | 5/2012 | Bar-Zeev et al. | 345/633 |
| 2012/0113092 | A1 | * | 5/2012 | Bar-Zeev et al. | 345/419 |
| 2012/0119978 | A1 | * | 5/2012 | Border | G02B 27/0172 345/8 |
| 2012/0120103 | A1 | * | 5/2012 | Border et al. | 345/633 |
| 2012/0127284 | A1 | * | 5/2012 | Bar-Zeev | G02B 27/017 348/53 |
| 2012/0176296 | A1 | * | 7/2012 | Border et al. | 345/8 |
| 2012/0200787 | A1 | | 8/2012 | Fujishiro | |
| 2012/0274750 | A1 | * | 11/2012 | Strong | G01C 21/165 348/52 |
| 2013/0139082 | A1 | * | 5/2013 | Wheeler | G06F 3/012 715/765 |
| 2013/0249787 | A1 | * | 9/2013 | Morimoto | G06F 3/012 345/156 |
| 2015/0130911 | A1 | * | 5/2015 | Ohashi | H04N 5/64 348/53 |

FOREIGN PATENT DOCUMENTS

| | | |
|---|---|---|
| JP | 7-44227 A | 2/1995 |
| JP | 10-307698 A | 11/1998 |
| JP | 11-49991 A | 2/1999 |
| JP | 2006-277239 A | 10/2006 |
| JP | 3928211 B | 6/2007 |
| JP | 2012-163639 A | 8/2012 |

* cited by examiner

Primary Examiner — Seng H Lim
(74) Attorney, Agent, or Firm — ALG Intellectual Property, LLC (57) ABSTRACT

An image display system includes an image transmitter, a first display device that displays a first image, and a second display device that displays a second image, the second display device includes a display device side receiving unit that receives the second image, a display unit that displays the second image, a visual direction acquiring unit that acquires a current visual direction of the user, and a display device side transmitting unit that transmits the current visual direction, and the image transmitter includes a transmitter side receiving unit that receives the current visual direction, an extracting unit that extracts the first image as an image of a partial area in a whole image and the second image as an image of an area in response to the current visual direction in the whole image, and a transmitter side transmitting unit that transmits the first and second images.

9 Claims, 7 Drawing Sheets

IMAGE DISPLAY SYSTEM AND HEAD-MOUNTED DISPLAY DEVICE

BACKGROUND

1. Technical Field

The present invention relates to an image display system and a head-mounted display device.

2. Related Art

In related art, as image display devices for displaying images, head-mounted display devices (head-mounted displays) worn on heads of users have been known in addition to displays installed in predetermined positions (for example, see Patent Document 1 (JP-A-2012-163639)).

A head-mounted display disclosed in Patent Document 1 is adapted to be a see-through head-mounted display that enables observation of the outside world. Further, the head-mounted display modulates light output from a backlight provided in a temple of a frame in response to image information using a liquid crystal display device, and guides the light to an eye of a user via a lens using a light guide plate. Thereby, an image is visually recognized.

In a video game executed by a PC (Personal Computer), a game machine, or the like and played by operation of characters within a window scrolled in one direction, the character that is not able to keep up with the scrolling of the window may be excluded from the video game. For example, in a video game that can be executed by a plurality of users at the same time, if a character operated by a user scrolls the window in one direction, the game will be over for the user who operates a character that is not able to keep up with the scrolling of the window.

On the other hand, a configuration in which a display area of a display is divided in response to the number of users and operation windows with respect to each user are displayed has been proposed. However, in the configuration, there has been a problem that, when the number of users becomes larger, the respective operation windows become smaller and the operation becomes harder.

Further, it is conceivable that head-mounted displays worn by the respective users are connected to one game machine and operation windows with respect to each user are individually displayed. However, there has been a problem that the case is not so much different from the case where the respective users individually play a video game.

On the basis of the problems, a configuration in which the respective users may enlarge their observable ranges of a series of images like game windows of a video game has been desired.

SUMMARY

An advantage of some aspects of the invention is to provide an image display system and a head-mounted display device that may enlarge an observation range of an image.

An image display system according to a first aspect of the invention includes an image transmitter, a first display device that displays a first image received from the image transmitter, and a second display device that displays a second image received from the image transmitter, the second display device includes a display device side reception unit that receives the second image, a display unit that displays the received second image, a visual direction acquisition unit that acquires a current visual direction as a visual direction at the moment of the user, and a display device side transmission unit that transmits the acquired current visual direction, and the image transmitter includes a transmitter side reception unit that receives the current visual direction from the second display device, an extraction unit that extracts the first image as an image of a partial area in a whole image contained in an image for one frame and the second image as an image of an area in response to the current visual direction in the whole image, and a transmitter side transmission unit that transmits the first image and the second image.

Note that the whole image may be the entire image for one frame or an image within a predetermined area in the image for one frame.

According to the first aspect, in the whole image as the image for one frame, the first image as the image of the partial area is displayed in the first display device and the second image as the image of the area in response to the current visual direction of the user acquired by the visual direction acquisition unit is displayed in the second display device.

According to the configuration, the first image is not only displayed in the first display device but also the second image in response to the current visual direction of the user is displayed in the second display device, and thus, the user may observe the wider range in the whole image by changing the current visual direction. Therefore, the range that the user can observe in the whole image may be enlarged. Further, the game window of the above-described video game is displayed in the first display device and the second display device, the first image is displayed by the first display device that can be observed by a third party, and the third party other than the user (in this case, the player of the video game) may grasp the progress of the video game.

In the first aspect, it is preferable that the visual direction acquisition unit shows the current visual direction as an angle with respect to a reference visual direction as a direction in which the visual direction of the user is directed to the first display device.

According to the first aspect, the visual direction acquisition unit shows the current visual direction as the angle with respect to the reference visual direction with the direction toward the first display device displaying the first image as the reference visual direction. Here, the area extracted as the first image in the whole image is an area to which the reference visual direction is directed from the reference point corresponding to the position of the user, and the area acquired as the second image in the whole image may be easily set by the current visual direction represented by the angle with respect to the reference visual direction. Therefore, the extraction of the second image by the extraction unit may be easily and reliably performed.

In the first aspect, it is preferable that the second display device includes a displacement detection unit that detects displacement of the visual direction of the user, and the visual direction acquisition unit acquires the current visual direction based on an amount of displacement of the visual direction from the reference visual direction detected by the displacement detection unit.

According to the first aspect, the amount of displacement of the visual direction from the state in which the visual direction of the user coincides with the reference visual direction is acquired from the detection result by the displacement detection unit, and thereby, the visual direction acquisition unit may easily acquire the current visual direction of the user. Therefore, the visual direction acquisition processing may be simply performed.

In the first aspect, it is preferable that the second display device has a position detection unit that detects a position of the first display device, and the visual direction acquisition unit uses the visual direction of the user when the position of the first display device is detected by the position detection unit as the reference visual direction.

According to the first aspect, the visual direction acquisition unit may use the visual direction of the user when the position detection unit detects the position of the first display device as the reference visual direction, and thus, it is unnecessary for the user to perform setting operation of the reference visual direction. In addition, the reference visual direction may be appropriately and reliably set, and, if the current visual direction coincides with the reference visual direction, production of a difference between contents of the image displayed by the first display device and contents of the image displayed by the second display device may be suppressed.

In the first aspect, it is preferable that the second display device includes a see-through head-mounted display device worn on a head of the user, the display unit includes an image formation unit that forms the second image, a light-transmissive light guide member that guides the second image formed by the image formation unit to an eye of the user and transmits outside light, and a shutter that is provided outside of the light guide member and controls incidence of the outside light to the eye of the user, and the second display device has a drive control unit that operates the shutter to shield the outside light if the current visual direction is not a direction toward the first display device, and operates the shutter to transmit the outside light if the current visual direction is the direction toward the first display device.

Here, the see-through head-mounted display device refers to a head-mounted display device (head-mounted display) that enables observation not only of the formed image but also of the outside world. On the other hand, a closed head-mounted display device enables observation only of the formed image, not the outside world. Further, as the shutter, a liquid crystal shutter that can switch a transmission state and a shield state of light may be employed.

According to the first aspect, if the current visual direction is a direction toward the first display device, the drive control unit sets the shutter to the transmission state and the user may observe the first image displayed in the first display device via the second display device. Thereby, for example, when the resolution of the image that can be displayed in the first display device is higher than the resolution of the image that can be displayed in the second display device, the high-definition first image may be observed.

Further, if the current visual direction is not the direction toward the first display device, the drive control unit sets the shutter to the shield state. Thereby, the visual recognition of the outside world by the user may be reduced and the second image displayed in the display unit may be clearly observed. Therefore, the higher sense of immersion may be obtained.

In the first aspect, it is preferable that the second display device has an image processing unit of resizing the received second image to substantially the same size as an apparent size of the first image observed by the user when the current visual direction is directed to the first display device.

Here, when the size of the first image and the size of the second image seen by the user are different, the sense of the first image and the second image as images respectively forming partial images of the whole image is hard to be obtained. On the other hand, in the first aspect described above, the second image is resized, and thereby, the apparent size of the first image and the size of the second image may be made substantially the same. Therefore, the viewing angle range in which the first image is observed and the viewing angle range in which the second image is observed may be made the same in the field of view of the user, and a feeling of strangeness when the user respectively observes the first image and the second image may be reduced and the sense of immersion may be obtained.

In the first aspect, it is preferable that the first display device has an image display area for displaying the first image, the second display device includes a size detection unit that detects an apparent size of the image display area from the user, and the image processing unit resizes the second image in response to the apparent size of the image display area detected by the size detection unit.

According to the first aspect, resizing of the second image by the image processing unit may be performed according to the apparent size of the first image actually observed by the user. Therefore, the apparent size of the first image and the size of the second image may be made the same.

A head-mounted display device according to a second aspect of the invention is a head-mounted display device worn on a head of a user including a displacement detection unit that detects displacement of a visual direction of the user, an image acquisition unit that acquires an image of an area in response to the displacement of the visual direction detected by the displacement detection unit with reference to a preset area in a whole image contained in an image for one frame, and a display unit that displays the image acquired by the image acquisition unit.

According to the second aspect, not only the image of the area preset in the whole image but also the image of the area in response to the visual direction of the user in the whole image may be observed. Therefore, the observation range of the whole image may be enlarged and the whole image in the larger size may be observed without reduction.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

As below, the first embodiment of the invention will be explained with reference to the drawings.
Overall Configuration of Image Display System FIG. 1 is a schematic diagram showing an overall configuration of an image display system 1 according to the embodiment.

Figure 1:
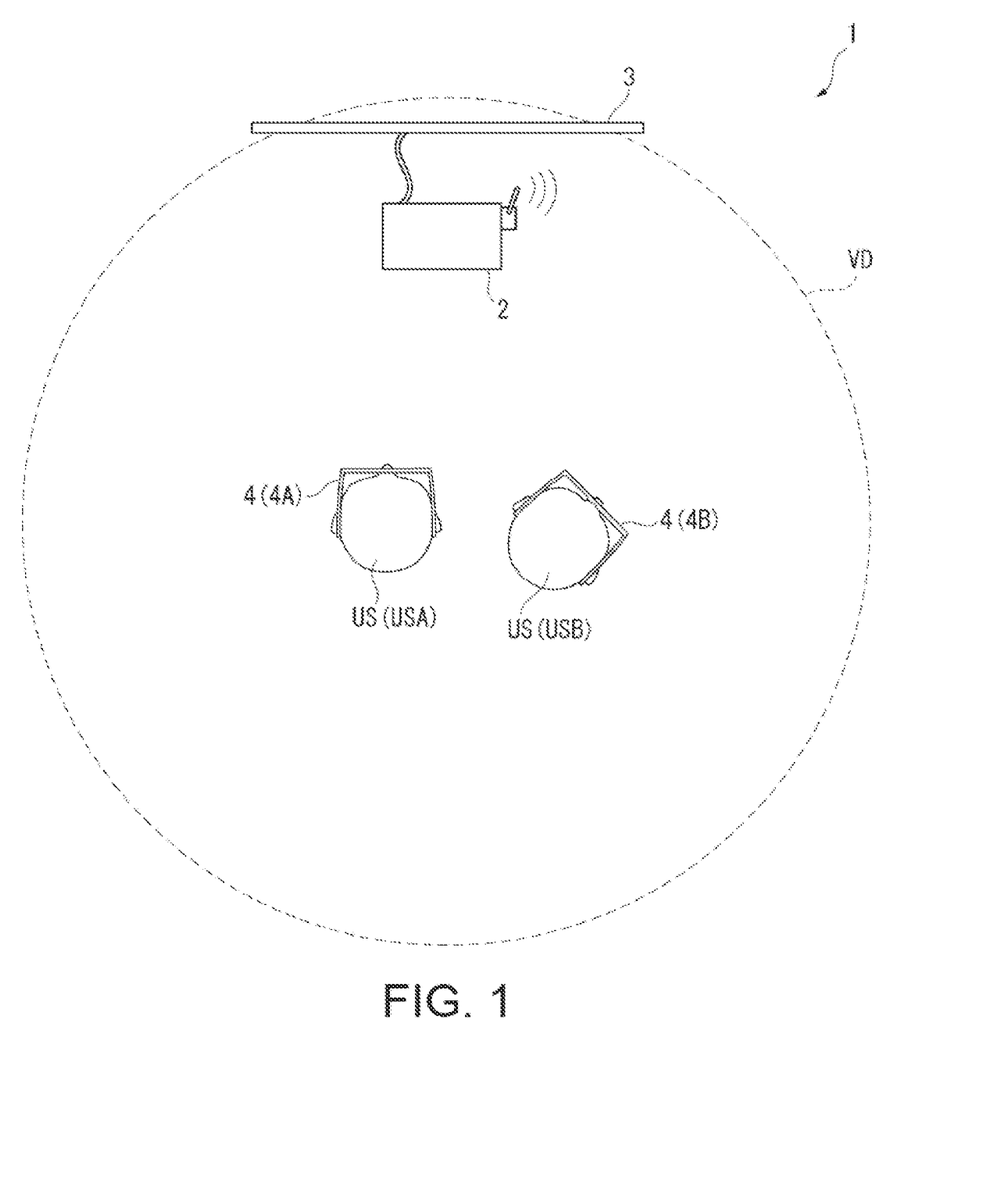
FIG. 1 is a schematic diagram showing an overall configuration of an image display system according to a first embodiment of the invention.

As shown in FIG. 1, the image display system 1 according to the embodiment includes an image transmitter 2, and an installation-type display (hereinafter, may be abbreviated to "display") 3 and a head-mounted display (hereinafter, may be abbreviated to "HMD") 4 (4A, 4B) that are connected to the image transmitter 2. The display 3 and the HMD 4 (4A, 4B) respectively display images in response to image information (including image data and image signals) transmitted from the image transmitter 2. One of the features of the image display system 1 is in setting a virtual display surface VD having a circular shape around a current position of a user US (USA, USB) in a plan view with respect to each user US, fitting a whole image as an image for one frame in the virtual display surface VD, displaying an image within a predetermined area in the whole image as a first image on the display 3, and displaying the image within an area in response to the current visual direction of the user US wearing the HMD 4 in the whole image on the HMD 4.

Note that, in the embodiment, the image display system 1 includes two HMDs 4 (4A, 4B) and the number of HMD 4 may be appropriately changed.

Configuration of Image Transmitter

Figure 2:
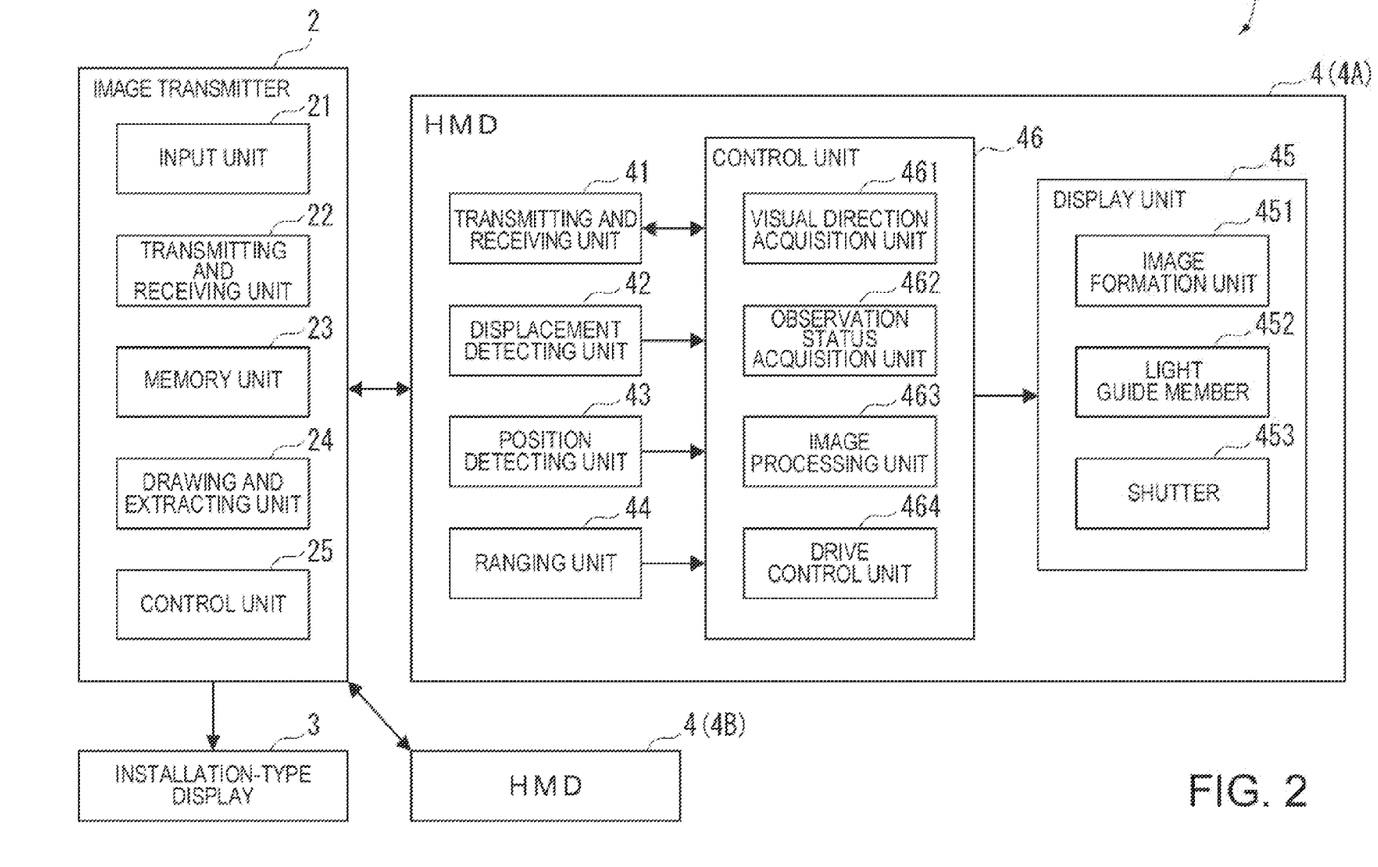
FIG. 2 is a block diagram showing a configuration of the image display system in the embodiment.

FIG. 2 is a block diagram showing a configuration of the image display system 1.

The image transmitter 2 draws the whole image, transmits the first image as the image within the area to be displayed on the display 3 in the whole image to the display 3, and transmits a second image as an image within the area in response to the visual direction of the user US to the HMD 4. Specifically, the image transmitter 2 includes a game machine, a PC, or the like in the embodiment, and draws images in response to the progress of a game and a whole image containing images such as paintings and scenery images and respectively transmits the first image and the second image extracted from the whole image to the display 3 and the HMD 4.

As shown in FIG. 2, the image transmitter 2 includes an input unit 21, a transmitting and receiving unit 22, a memory unit 23, a drawing and extracting unit 24, and a control unit 25.

The input unit 21 includes a key board, a pointing device, a controller, or the like and outputs operation signals in response to the operation by the user to the control unit 25.

The transmitting and receiving unit 22 performs transmission and reception of information between the display 3 and the HMD 4 and itself under the control of the control unit 25. For example, the transmitting and receiving unit 22 transmits the image information of the first image to the display 3 and transmits the image information of the second image to the HMD 4. Further, the transmitting and receiving unit 22 receives observation status information to be described later from the HMD 4. That is, the transmitting and receiving unit 22 has a function as a transmitter side reception unit and a transmitter side transmission unit according to the invention.

The memory unit 23 includes an HDD (Hard Disk Drive) in the embodiment, and stores various programs and data necessary for operation of the image transmitter 2. As the data, the memory unit 23 stores image data of backgrounds, characters, etc. used at drawing of the whole image to be described later. Note that the image data may be stored in various recording media including a disk recording medium such as a DVD and semiconductor memories. When the data recorded in the recording medium is used, a drive or a reader that can read out the data may be provided in the image transmitter 2.

The drawing and extracting unit 24 draws the whole image for one frame based on the image data stored in the memory unit 23 in a frame memory (not shown).

Further, the drawing and extracting unit 24 has a function as an extraction unit according to the invention, and sets a reference area in a predetermined position and extracts an image within the reference area as the first image in the whole image. The first image is an image observed when the current visual direction of the user coincides with a reference visual direction (a direction in which the visual direction of the user is directed to an image display area 31 to be described later of the display 3). In other words, the reference area is an area observed, in the case where the whole image is fitted in the circular virtual display surface VD (see FIG. 1), when the visual direction of the user located at the center of the virtual display surface VD coincides with the reference visual direction in the whole image.

Furthermore, in the case where the whole image is fitted in the circular virtual display surface VD (see FIG. 1), the drawing and extracting unit 24 extracts an image within the area in response to the current visual direction shown by the observation status information as the second image from the whole image. The details of current visual direction contained in the observation status information will be described later, and the current visual direction is expressed by a relative angle in the current visual direction of the user with respect to the reference visual direction.

Figure 3:
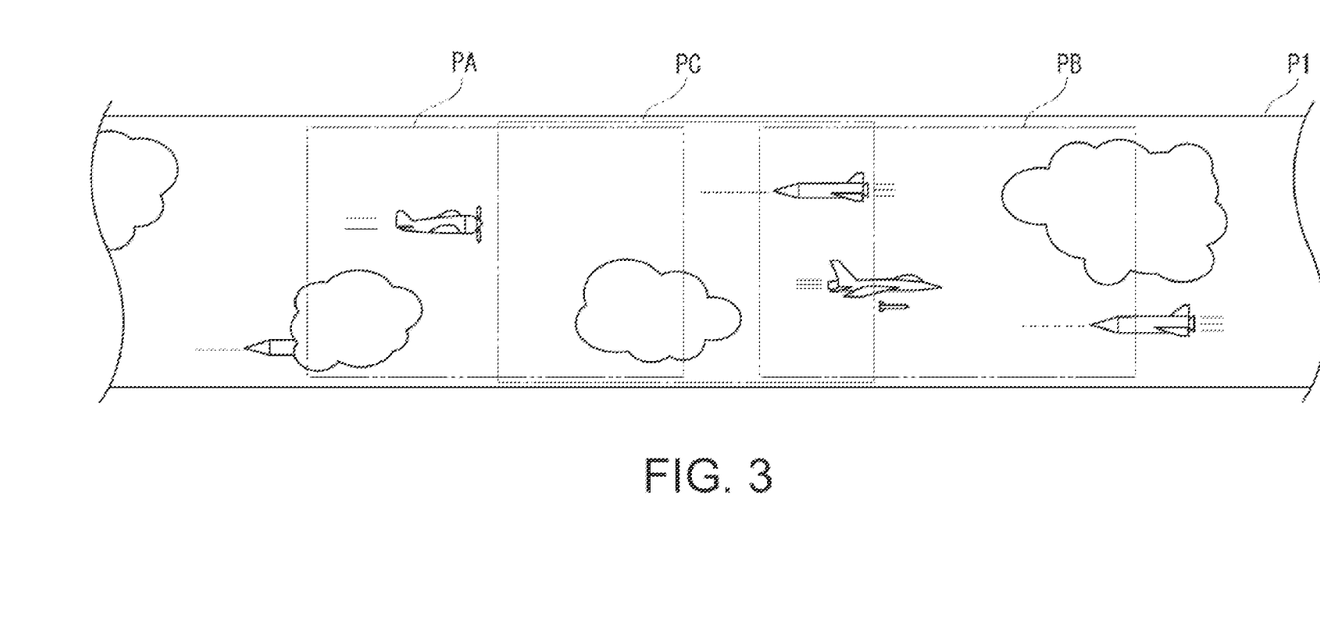
FIG. 3 shows an example of a whole image in the embodiment.

FIG. 3 shows an example of a whole image P1 drawn by the image transmitter 2.

For example, the drawing and extracting unit 24 draws the landscape whole image P1 as a game image shown in FIG. 3. Then, the drawing and extracting unit 24 sets a reference area PA in the whole image P1 and extracts an image within the reference area PA as the first image. Then, the drawing and extracting unit 24 transmits the image information of the extracted first image to the display 3 via the transmitting and receiving unit 22. Note that the dimensions of the reference area PA are set in response to the aspect ratio of the image display area 31 (see FIG. 4) to be described later of the display 3.

Further, the drawing and extracting unit 24 acquires the observation status information received from the HMD 4 by the transmitting and receiving unit 22. Then, the drawing and extracting unit 24 acquires visual direction information representing the current visual direction expressed by the angle with respect to the reference visual direction (the direction in which the user wearing the HMD 4 faces the display 3) and a relative distance between the HMD 4 and the image display area 31 from the observation status information.

Then, when the whole image P1 is fitted in the virtual display surface VD and the reference area PA in the whole image P1 is located in a position in response to the reference visual direction, the drawing and extracting unit 24 extracts an image within an area in response to the current visual direction and the relative distance (for example, an area PB in FIG. 3), i.e., an image within an area within the field of view of the user around the current visual direction as the second image from the whole image P1. Then, the drawing and extracting unit 24 transmits image information of the extracted second image P12 to the HMD 4 to which the observation status information has been transmitted via the transmitting and receiving unit 22.

The drawing and extracting unit 24 extracts the second image based not only on the current visual direction but also the relative distance because the observation range of the user in the whole image P1 fitted in the virtual display surface VD, i.e., the viewing angle of the user changes depending on the relative distance between the HMD 4 (i.e., the user) and the virtual display surface VD.

Note that, in the embodiment, the drawing and extracting unit 24 moves the reference area PA in the whole image P1 as time passes in one direction (e.g., one direction along the longitudinal direction of the whole image P1, to the right in the example of FIG. 3). Accordingly, the observer observing the first image as the image in response to the reference area PA and displayed on the display 3 (including the user wearing the HMD 4) observes that the displayed image appears to be scrolled in the one direction as time passes.

The control unit 25 controls the operation of the image transmitter 2. For example, the control unit 25 controls communications between the display 3 and the HMD 4 by the transmitting and receiving unit 22. Further, the control unit 25 executes game programs stored in the memory unit 23 (including game programs acquired via networks and stored in the memory unit 23) and game programs loaded from the above-described recording media. Then, the control unit 25 allows the drawing and extracting unit 24 to execute image transmission processing including drawing of the whole image as the game image and extraction and transmission of the first image and the second image when executing the game program.

Note that the transmission of the image information of the second image is not performed when the current visual direction coincides with the reference visual direction in the embodiment. This is for omission of unnecessary processing because, when the reference visual direction coincides with the current visual direction, the first image and the second image are the same image and the user wearing the see-through HMD 4 is allowed to observe the first image displayed on the display 3.

Accordingly, the control unit 25 determines whether or not the reference visual direction coincides with the current visual direction and, if they are different, allows extraction processing of the second image and the transmission processing of the second image and, if they are the same, regulates execution of the respective processing.

Not limited to that, however, the image transmitter 2 may determine whether or not to display the second image P12 by constantly extracting and transmitting the second image in response to the current visual direction, and executing determination processing as to whether or not the reference visual direction coincides with the current visual direction at the HMD 4 side that has received the image information of the second image.

Configuration of Display

Figure 4:
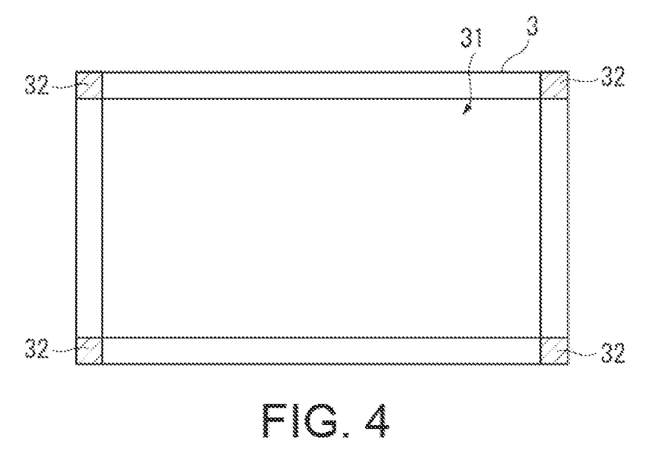
FIG. 4 is a schematic diagram showing a display in the embodiment.

FIG. 4 is a schematic diagram showing the display 3.

As described above, the display 3 is an installation-type display installed in a predetermined position within a space in which the image display system 1 is placed, and corresponds to a first display device according to the invention. As shown in FIG. 4, the display 3 has the rectangular image display area 31 for displaying the first image in response to the image information received from the image transmitter 2.

As the display 3, various displays of liquid crystal, plasma, organic EL (Electroluminescence), CRT (Cathode Ray Tube), etc. may be exemplified. Further, the size of the display 3 may be appropriately selected.

Note that the display 3 has markers 32 provided outside of the image display area 31 and showing the position of the image display area 31. Specifically, the markers 32 are provided in positions corresponding to four corners of the image display area 31 outside of the image display area 31. These markers 32 are detected by a position detecting unit 43 to be described later of the HMD 4, and thereby, the position, the direction, and the dimensions of the image display area 31 as seen from the HMD 4 (i.e., the user wearing the HMD 4) are detected. As the markers 32, light emitting devices that output predetermined color lights (e.g., infrared lights), predetermined marks, or colored marks may be exemplified.

Configuration of HMD

The HMD 4 corresponds to a second display device according to the invention. As shown in FIG. 1, the HMD 4 is a head-mounted image display device (virtual image display device) worn on the head of the user US and allowing the formed image to enter the eye of the user US for visual recognition of the image, and formed as a see-through head-mounted display in the embodiment. The HMD 4 transmits the observation status information to the image transmitter 2 and receives and displays the second image in response to the current visual direction of the user US from the image transmitter 2.

As shown in FIG. 2, the HMD 4 includes a transmitting and receiving unit 41, a displacement detecting unit 42, the position detecting unit 43, a ranging unit 44, a display unit 45, a control unit 46, and a frame (not shown) for attachment of the units. Of them, the frame has a configuration like a frame of spectacles.

The transmitting and receiving unit 41 is wirelessly communication-connected to the image transmitter 2 and transmits and receives information using a predetermined communication protocol in the embodiment. Specifically, the transmitting and receiving unit 41 receives the image information of the second image P12 from the image transmitter 2 and transmits the observation status information based on the detection results of the respective detecting unit 42 to 44 to the image transmitter 2. That is, the transmitting and receiving unit 41 has a function corresponding to a display device side reception unit and a display device side transmission unit according to the invention. Note that the unit may be adapted to be communication-connected to the image transmitter 2 with wires.

The displacement detecting unit 42 detects an amount of displacement of the visual direction of the user based on the attitude of the user wearing the HMD 4. Specifically, the displacement detecting unit 42 includes a sensor that detects the orientation of the head of the user and a sensor that detects the orientation of the body attached to the frame, and detects the direction of displacement and the amount of displacement of the visual direction of the user based on the detection results of the sensors. Then, the displacement detecting unit 42 outputs the detection results to the control unit 46. As the sensors, three-dimensional gyro sensors or the like may be exemplified.

The position detecting unit 43 detects the position of the image display area 31. In the embodiment, the position detecting unit 43 has a sensor that detects the above-described markers 32 attached to the frame, and detects the position and the direction of the image display area 31 as seen from the HMD 4 based on the detection result by the sensor. Further, in the embodiment, since the markers 32 are provided in the positions corresponding to the four corners of the image display area 31, the positions of the markers 32 are detected, and thereby, the position detecting unit 43 detects the size of the image display area 31 as seen from the HMD 4. Then, the position detecting unit 43 outputs the detection result to the control unit 46.

As described above, the position detecting unit 43 has a function as a position detection unit and a size detection unit according to the invention.

Note that the sensor of the position detecting unit 43 is placed so that the detection direction of the sensor may coincide with the current visual direction of the user, and further, the detection range of the markers 32 by the position detecting unit 43 is set in response to the field of view of the user. Thereby, whether or not the markers 32 are located, i.e., whether or not the image display area 31 is located within the field of view of the user may be appropriately determined, and further, the viewing angle at which the image display area 31 is located within the field of view may be detected. As the sensor, in the case where the markers 32 output predetermined color lights, a sensor that detects the color lights may be exemplified, and further, a sensor having an imaging device such as a CCD (Charge Coupled Device) or CMOS (Complementary Metal Oxide Semiconductor) device may be exemplified.

Note that, in the case where the position detecting unit 43 includes the sensor having the imaging device, the position of the image display area 31 or the like may be detected based on a taken image by the imaging device.

The ranging unit 44 measures the relative distance between the user wearing the HMD 4 and the image display area 31 when the markers 32 are detected by the position detecting unit 43. The ranging unit 44 may have a ranging sensor that can measure the distance by outputting infrared light or the like, and the ranging unit 44 outputs the detection result to the control unit 46.

The display unit 45 forms an image in response to image signals input from the control unit 46 and displays the image to be visually recognized by the user. The display unit 45 includes an image formation unit 451 that forms images in response to the image signals, a light guide member 452 that guides light entering from the image formation unit 451 to the eye of the user, and a shutter 453.

The image formation unit 451 corresponds to an image formation unit according to the invention and, though illustration is omitted, includes a light source, a light modulator that modulates luminous flux output from the light source, and a projection optical unit that projects the modulated light. Note that, as the light modulator, a transmissive or reflective liquid crystal panel or a device using a micromirror may be exemplified.

In the light guide member 452, a half mirror is provided in a position corresponding to the eye of the user and the light entering from the image formation unit 451 into the light guide member 452 travels within the light guide member 452 while being reflected and is reflected toward the eye of the user by the half mirror. Accordingly, the user can observe the image formed by the light and further observe the outside world.

The shutter 453 is a light shielding unit adapted to switch a transmission state in which outside light (outside world image) is transmitted and a shield state in which the outside light is shielded under the control of the control unit 46. The shutter 453 is provided outside of the light guide member 412, i.e., in an optical path of the outside light transmitted through the light guide member 452 and entering the eye of the user. Accordingly, switching may be performed between a state in which the outside light is shielded and only the image can be observed and a state in which the outside light is transmitted and the outside world can be observed. As the shutter 453, a liquid crystal shutter may be employed and, particularly, a liquid crystal shutter that can switch between the transmission state and the shield state in units of pixels may be employed.

The control unit 46 is formed as a circuit substrate on which a control circuit for controlling the HMD 4 is mounted. The control unit 46 has a visual direction acquisition unit 461, an observation status acquisition unit 462, an image processing unit 463, and a drive control unit 464.

The visual direction acquisition unit 461 corresponds to a visual direction acquisition unit according to the invention and acquires visual direction information representing the current visual direction of the user based on the detection results of the displacement detecting unit 42 and the position detecting unit 43.

Specifically, the visual direction acquisition unit 461 first judges that a status in which the position detecting unit 43 detects the markers 32 (all markers 32 when a plurality of markers 32 are provided) as a status in which the current visual direction of the user is directed to the image display area 31 (the current visual direction coincides with the reference visual direction).

Then, the visual direction acquisition unit 461 acquires the direction of displacement and the amount of displacement of the current visual direction from the reference visual direction and acquires visual direction information representing the current visual direction by the relative angle with the reference visual direction as zero degrees based on the detection result by the displacement detecting unit 42 from the status.

In this regard, as described above, the whole image P1 in the embodiment is the landscape image extending in the horizontal directions, and, for example, the current visual direction when the image moves from the reference visual direction to the right is expressed by the angle having a positive (+) value and the current visual direction when the image moves from the reference visual direction to the left is expressed by the angle having a negative (−) value. In this manner, the visual direction information representing the current visual direction is acquired.

Then, the visual direction acquisition unit 461 transmits the observation status information including the visual direction information to the image transmitter 2 via the transmitting and receiving unit 41. Note that the observation status information includes unique information for identification of the HMD 4 that has transmitted the observation status information (e.g., IP (Internet Protocol) address)) and further includes the relative distance measured by the ranging unit 44.

The observation status acquisition unit 462 acquires the apparent size of the image display area 31 (the apparent size of the image display area 31 observed by the user) from the HMD 4 based on the detection result by the position detecting unit 43. In other words, the unit acquires the viewing angle at which the image display area 31 is located within the field of view of the user (the viewing angle in the horizontal direction and the viewing angle in the vertical direction).

The image processing unit 463 corresponds to an image processing unit according to the invention and processes the image information of the second image received from the image transmitter 2. In this regard, the image processing unit 463 resizes the second image so that the size acquired by the observation status acquisition unit 462 and the size of the image displayed by the display unit 45 and visually recognized by the user may be the same.

Note that, when the display unit 45 is formed so that an image of 40 inches is visually recognized 2.5 m before the user, if the size of the image display area 31 is diagonally 40 inches and the relative distance between the image display area 31 and the user is 2.5 m, the apparent size of the image display area 31 and the apparent size of the image displayed in the HMD 4 are substantially the same. Accordingly, under the condition, the resizing processing is dispensable.

The drive control unit 464 controls the communication status with the image transmitter 2 by the transmitting and receiving unit 41.

In addition, the drive control unit 464 outputs the image signals in response to the image information processed by the image processing unit 463 to the display unit 45 and controls the operation of the display unit 45.

For example, the drive control unit 464 allows the image formation unit 451 to form the second image in response to the image information. Further, the drive control unit 464 sets the shutter 453 to the transmission state if having determined that the current visual direction acquired by the visual direction acquisition unit 461 coincides with the reference visual direction, and sets the shutter 453 to the shield state if having determined that the current visual direction does not coincide with the reference visual direction. In this regard, the area of the shutter 453 corresponding to the range in which the virtual display surface VD is not located in the current field of view of the user may be set to the transmission state for observation of the outside world image or the shield state for a sense of immersion. The drive control unit 464 corresponds to a drive control unit according to the invention.

Note that, under the condition that the virtual display surface VD is contained within the field of view of the user, when the drive control unit 464 allows the display unit 45 to display an image, the image is displayed so that the viewing angle at which the image display area 31 is located may coincide with the viewing angle of the displayed image in the direction orthogonal to the longitudinal direction of the whole image. Accordingly, when the whole image is the landscape image extending in the horizontal directions, the vertical viewing angle at which the display 3 is observed in the field of view of the user coincides with the vertical viewing angle at which the image displayed in the HMD 4 is observed. The current visual direction is horizontally moved from the visual direction when the display 3 is observed (reference visual direction), and thereby, the image displayed in the HMD 4 may be observed at the same viewing angle as that of the image displayed on the display 3.

On the other hand, the auxiliary field of view of a human (the region in which only the existence of stimulus is known) is recognized to be horizontally 200 degrees (100 degrees to the right and 100 degrees to the left) around the visual direction when facing the front, and vertically about 125 degrees (about 50 degrees upward and about 75 degrees downward). However, the stable field of fixation (the region in which the eye may be effortlessly fixed by the motion of eye balls and the head and information may be effectively received) is recognized to be horizontally from 60 to 90 degrees and vertically from 45 to 70 degrees.

In this regard, when the display unit 45 of the HMD 4 displays an image so that the center of the displayed image may substantially coincide with the center of the field of view of the user, the image may be easily displayed within the stable field of fixation. Therefore, the image displayed by the HMD 4 may be easily and visually recognized by the user.

Figure 5:
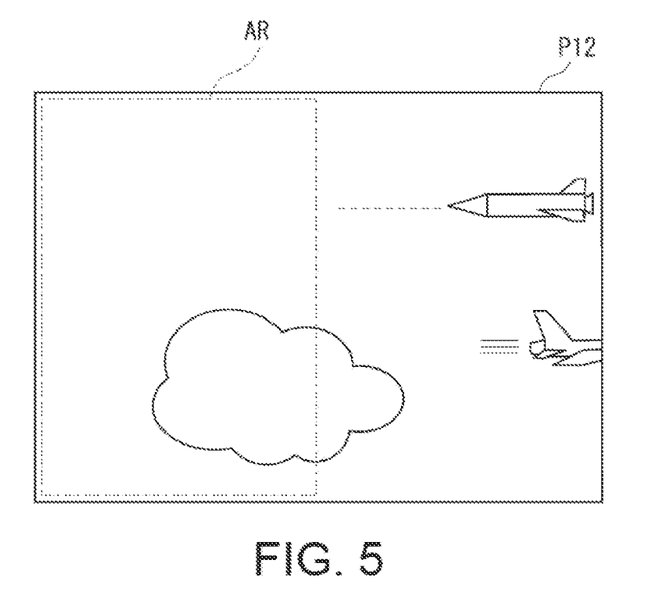
FIG. 5 shows a state in which a first image partially overlaps with a second image in the embodiment.

FIG. 5 shows a state in which a part of the first image overlaps with the second image.

Here, depending on the current visual direction, in the whole image P1, a part of the area corresponding to the second image may overlap with a part of the reference area PA corresponding to the first image. For example, the second image P12 shown in FIG. 5 is the image within the area PC in FIG. 3, and an image within an area AR shown by a dotted line in the second image P12 is the image contained in the reference area PA. In this case, the drive control unit 464 allows the display unit 45 to display the received second image P12 and sets the shutter 43 to the shield state. Thereby, even when there is an area overlapping with the first image in the second image P12, the second image P12 is visually recognized as the image displayed by the display unit 45.

Note that the drive control unit 464 may allow the display unit 45 to display only the image not overlapping with the reference area PA in the second image P12, set the area corresponding to the non-overlapping area in the shutter 453 to the shield state, and set the area corresponding to the overlapping area to the transmission state. In this case, the image in the non-overlapping area may be displayed by the display unit 45 and visually recognized, and the image in the overlapping area may be visually recognized by observation of the image display area 31.

Image Display Processing by Image Display System

Figure 6:
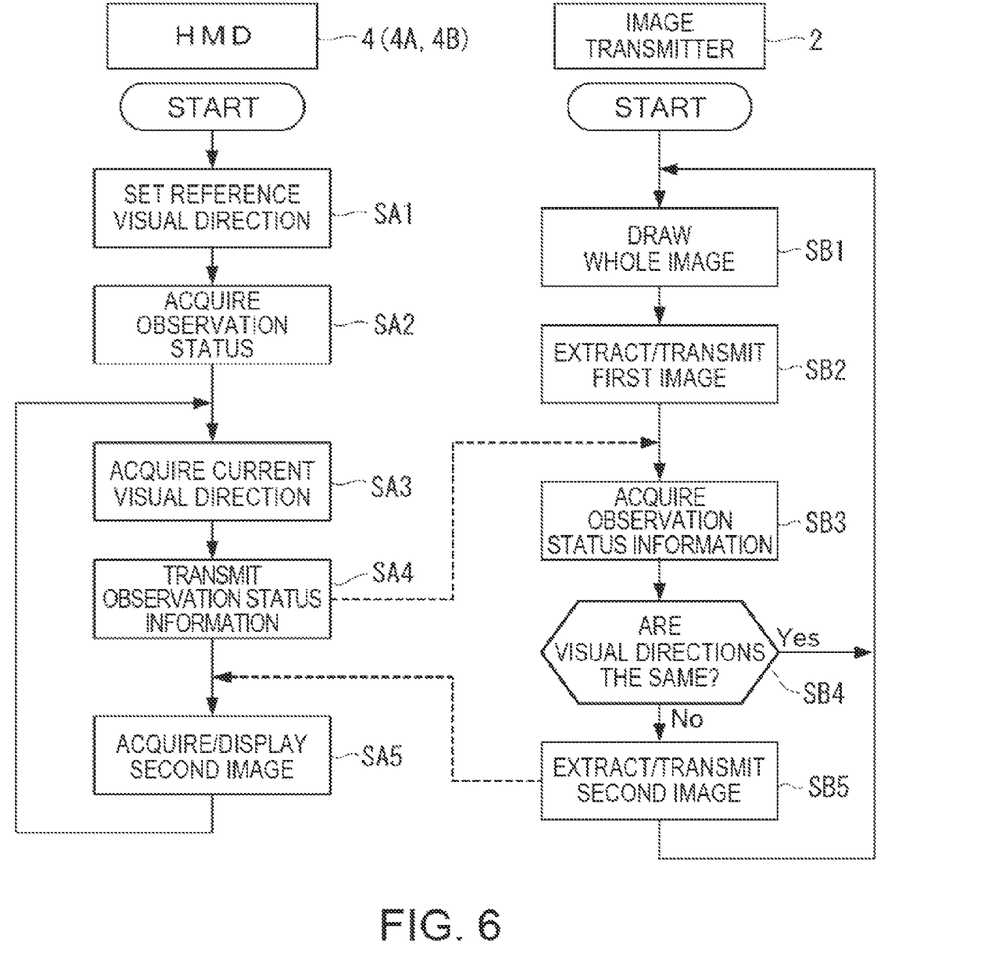
FIG. 6 is a flowchart showing image display processing in the embodiment.

FIG. 6 is a flowchart showing the image display processing in the image display system 1. Note that, in FIG. 6, the processing of the display 3 is omitted.

In the image display system. 1, the image transmitter 2, the display 3, and the HMD 4 cooperatively execute the image display processing shown in FIG. 6.

In the image display processing, first, the visual direction acquisition unit 461 of the HMD 4 sets the reference visual direction based on the detection result of the position detecting unit 43 (step SA1).

Further, regarding the HMD 4, the observation status acquisition unit 462 acquires the observation status including the apparent size of the image display area 31 based on the detection result of the position detecting unit 43 and the relative distance measured by the ranging unit 44 (step SA2).

Then, the visual direction acquisition unit 461 acquires the visual direction information representing the current visual direction based on the detection result by the displacement detecting unit 42 (step SA3).

Then, the drive control unit 464 transmits the acquired visual direction information and relative distance and the observation status information including the unique information of the HMD 4 to the image transmitter 2 via the transmitting and receiving unit 41 (step SA4). Then, the HMD 4 shifts the processing to step SA5.

On the other hand, in the image transmitter 2, the drawing and extracting unit 24 draws the whole image P1 (step SB1).

Then, the drawing and extracting unit 24 sets the reference area PA in the whole image P1 and extracts the image within the reference area PA as the first image. Then, the drawing and extracting unit 24 transmits the image information of the extracted first image to the display 3 via the transmitting and receiving unit 22 (step SB2). Thereby, the first image is displayed in the image display area 31 of the display 3.

Further, the control unit 25 acquires the observation status information transmitted from the HMD 4 by the transmitting and receiving unit 22 (step SB3).

Then, the control unit 25 determines whether or not the current visual direction shown by the visual direction information contained in the observation status information coincides with the reference visual direction (step SB4). Specifically, the control unit 25 determines whether or not the angle of the current visual direction is "0 degrees".

In the determination processing at step SB4, if having determined that the current visual direction coincides with the reference visual direction, the control unit 25 regulates the transmission of the image information of the second image. Accordingly, the extraction and the transmission of the second image are not executed, and the image transmitter 2 shifts the processing to step SB1.

In the determination processing at step SB4, if having determined that the current visual direction does not coincide with the reference visual direction, the control unit 25 does not regulate the transmission of the second image. Accordingly, the drawing and extracting unit 24 extracts the image within the area in response to the current visual direction and the relative distance as the second image in the whole image P1, and transmits the image information of the second image to the HMD 4 specified by the unique information contained in the observation status information (step SB5).

Then, the image transmitter 2 shifts the processing to step SB1 and the processing at the steps SB1 to SB5 is repeatedly executed.

At step SA5 executed by the HMD 4, the image processing unit 463 processes the image information of the second image received from the image transmitter 2, and the drive control unit 464 allows the display unit 45 to display the second image (step SA5). Concurrently, as described above, the image processing unit 463 resizes the second image P12 as necessary, and the drive control unit 464 adjusts the display position (viewing angle) of the second image P12 as necessary and controls the operation of the shutter 453. Thereby, the second image is visually recognized by the user.

Then, the HMD 4 shifts the processing to step SA3 and the processing at the steps SA3 to SA5 is repeatedly executed.

According to the above-described image display system 1 of the embodiment, there are the following advantageous effects.

In the whole image P1 as the image for one frame drawn by the image transmitter 2, the first image as the image within the reference area PA is displayed in the installation-type display 3, and the second image as the image in the area in response to the current visual direction of the user US is displayed in the HMD 4.

According to the configuration, the user US may observe the wider range in the whole image P1 by changing the current visual direction. Therefore, the range that the user US may observe in the whole image P1 may be made larger. Further, the first image is displayed in the display 3 that can be observed by a third party, and thereby, the third party other than the user US may grasp the progress of the game.

The visual direction acquisition unit 461 uses the direction toward the image display area 31 of the display 3 displaying the first image as the reference visual direction and acquires the visual direction information representing the current visual direction as the angle with respect to the reference visual direction. Here, the reference area PA in the whole image P1 is the area in which the reference visual direction is directed from the reference point in response to the position of the user in the virtual display surface VD and the current visual direction is shown by the angle with respect to the reference visual direction, and thereby, the area of the image acquired as the second image in the whole image may be easily set. Therefore, the extraction of the second image by the drawing and extracting unit 24 functioning as the extracting unit may be easily and reliably performed.

Further, the visual direction acquisition unit 461 acquires the direction of displacement and the amount of displacement of the visual direction from the state in which the visual direction of the user coincides with the reference visual direction from the detection result by the displacement detecting unit 42. Accordingly, the visual direction acquisition unit 461 may easily acquire the visual direction information representing the current visual direction shown by the angle with respect to the reference visual direction. Therefore, the acquisition processing of the visual direction information may be simply performed.

The visual direction acquisition unit 461 uses the visual direction of the user when the position detecting unit 43 detects the position of the image display area 31 of the display 3 as the reference visual direction. Accordingly, it is unnecessary for the user to perform setting operation of inputting a predetermined entry key when facing the image display area 31, and the reference visual direction may be appropriately and reliably set.

If the current visual direction coincides with the reference visual direction, the drive control unit 464 sets the shutter 453 to the transmission state. Accordingly, the user may observe the first image displayed on the display 3 via the HMD 4. Therefore, when the resolution of the image that can be displayed in the display 3 is higher than the resolution of the image that can be displayed in the HMD 4, the high-definition first image may be observed.

Further, if the current visual direction does not coincide with the reference visual direction, the drive control unit 464 sets the shutter 453 to the shield state. Accordingly, the visual recognition of the outside world by the user may be reduced and the second image displayed in the display unit 45 may be clearly observed. Therefore, the higher sense of immersion may be obtained.

Here, when the size of the first image observed via the HMD 4 by the user and the size of the second image displayed and observed in the HMD 4 are different, the sense of the first image and the second image as a continuous image forming apart of the whole image is hard to be obtained.

On the other hand, the image processing unit 463 resizes the second image in response to the apparent first image size based on the detection result of the position detecting unit 43, and thereby, the apparent size of the first image and the size of the second image may be made substantially the same. Therefore, it may be easier to obtain the sense of immersion.

The image processing unit 463 acquires the apparent size of the image display area 31 in response to the detection result of the markers 32 provided in the positions corresponding to the four corners of the image display area 31 by the position detecting unit 43, and resizes the second image in response to the size of the image display area 31. Accordingly, the second image may be resized according to the apparent size of the first image actually observed by the user. Therefore, the apparent size of the first image and the size of the second image may be made the same.

Second Embodiment

As below, the second embodiment of the invention will be explained. Note that, in the following explanation, the same or substantially the same parts as the parts that have been already explained have the same signs and their explanation will be omitted.

Figure 7:
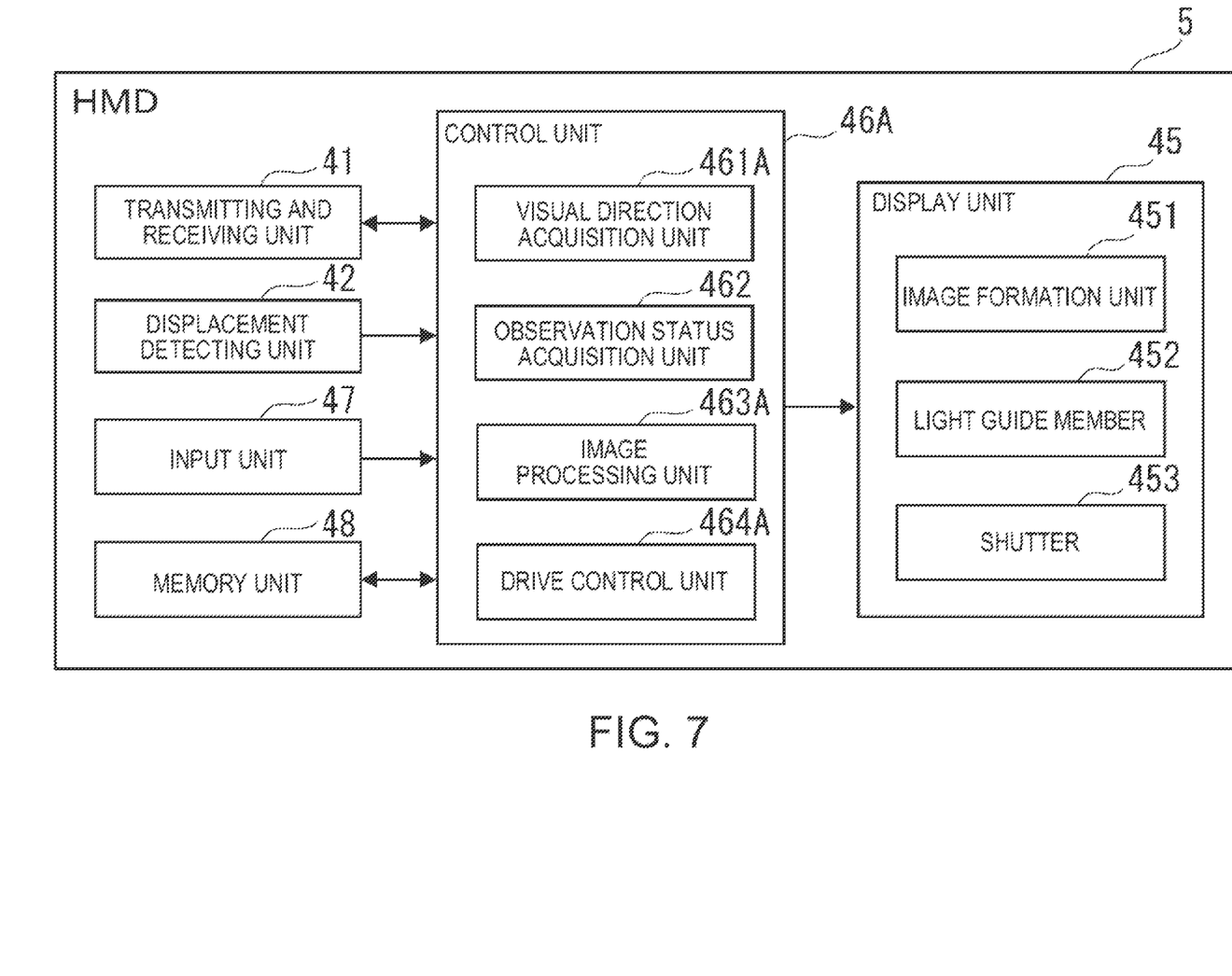
FIG. 7 is a block diagram showing a configuration of a head-mounted display according to a second embodiment of the invention.

FIG. 7 is a block diagram showing a configuration of an HMD 5 according to the embodiment.

The HMD 5 according to the embodiment is a head-mounted display device having a part of the function of the above-described image transmitter 2 to draw a whole image and display an image within an area corresponding to the current visual direction of the user in the whole image. The HMD 5 includes a see-through head-mounted display like the HMD 4 and has a transmitting and receiving unit 41, a displacement detecting unit 42, a display unit 45, and a frame (not shown), and further has an input unit 47, a memory unit 48, and a control unit 46A as shown in FIG. 7.

The input unit 47 has a plurality of entry keys and outputs operation signals in response to the pressed entry keys to the control unit 46A. As the entry keys, the input unit 47 has a power key for turning on/off of power of the HMD 5, a cursor key, and an enter key. Further, the input unit 47 has a reference visual direction setting key for setting the reference visual direction and a reference area setting key for setting the position of the reference area with respect to the whole image.

The memory unit 48 stores various programs and data necessary for operation of the HMD 5. In addition, the memory unit 48 stores image data of backgrounds, characters, etc. for drawing of the whole image for one frame like the above-described memory unit 23. Note that, like the configuration shown in the above-described first embodiment, the image data may be recorded in the above-described recording media. In this case, a drive or a reader that can read out the image data from the recording media may be provided in the HMD 5 or connected to the HMD 5.

The control unit 46A is formed as a circuit substrate on which a control circuit for controlling the HMD 5 is mounted like the control unit 46, and controls the operation of the HMD 5. The control unit 46A has a visual direction acquisition unit 461A, an observation status acquisition unit 462, an image processing unit 463A, and a drive control unit 464A.

The visual direction acquisition unit 461A acquires the current visual direction of the user shown by the angle with respect to the reference visual direction based on the detection result of the displacement detecting unit 42 like the visual direction acquisition unit 461.

Here, in the embodiment, the display 3 is not essential, and setting of the reference visual direction based on the detection result of the position detecting unit 43 is not performed. Accordingly, in the HMD 5, the visual direction of the user when the reference visual direction setting key is entered is used as the reference visual direction, and the visual direction acquisition unit 461A acquires the visual direction information representing the current visual direction based on the direction of displacement and the amount of displacement of the visual direction detected by the displacement detecting unit 42.

Note that, in the embodiment, in the amount of displacement of the visual direction detected by the displacement detecting unit 42, not only the amount of horizontal displacement but also the amount of vertical displacement are detected. Accordingly, the visual direction of the user may be acquired in all directions.

Figure 8:
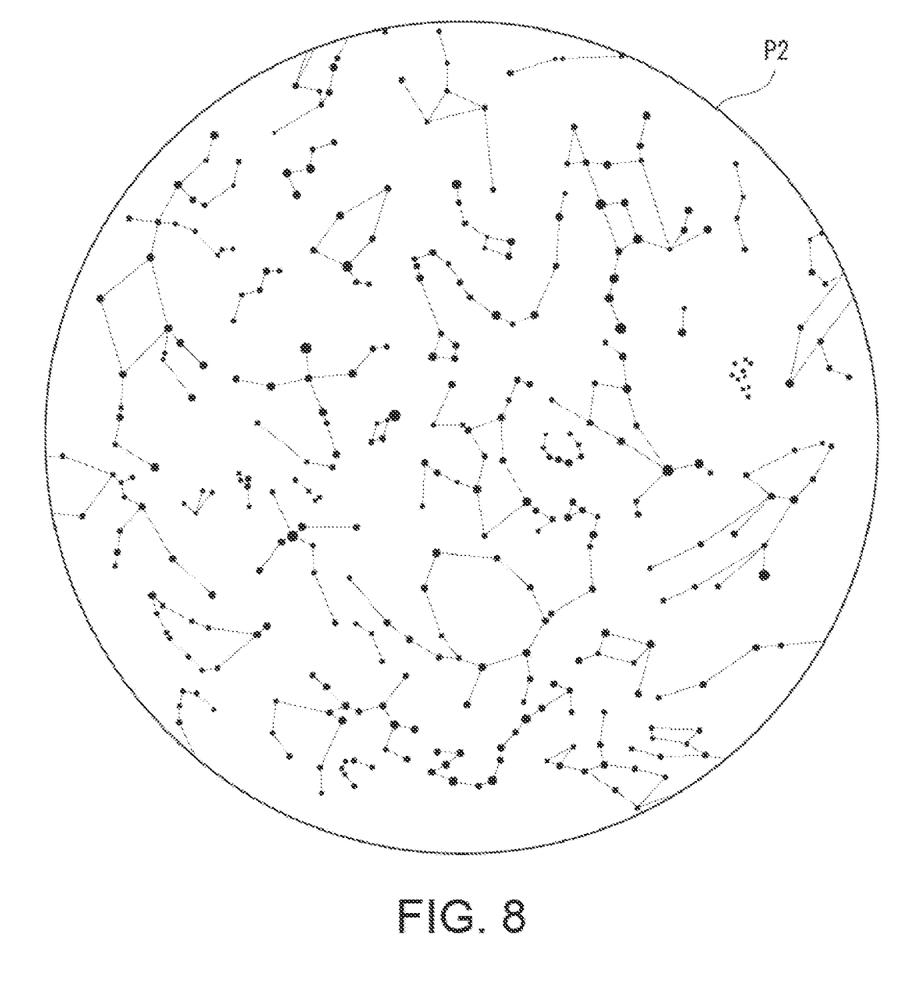
FIG. 8 shows an example of a whole image in the embodiment.

FIG. 8 shows an example of a whole image P2 drawn by the image processing unit 463A.

The image processing unit 463A corresponds to an image acquisition unit according to the invention. The image processing unit 463A draws the whole image for one frame in a frame memory (not shown) based on the image data. Further, the image processing unit 463A sets the reference area PA in a predetermined size in a predetermined position with respect to the whole image P2. For example, when the virtual display surface in which the whole image is fitted is set in a semispherical shape covering above the head of the user, the image processing unit 463A draws the circular whole image along the virtual display surface as shown in FIG. 8. The whole image P2 shown in FIG. 8 is a whole image representing the starry sky containing various constellations.

Then, the image processing unit 463A extracts an image within an area shown by the angle with respect to the reference visual direction in response to the current visual direction represented by the visual direction information in the whole image P2 fitted in the semispherical virtual display surface around the user based on the visual direction information acquired by the visual direction acquisition unit 461A.

Note that the position of the reference area PA set in the whole image P2, from which the image within the area is extracted if the current visual direction coincides with the reference visual direction, may be set in advance, however, may be set in response to the input operation for the input unit 47 in the embodiment.

For example, an image formed by superimposition of a rectangular area showing the reference area PA on the whole image P2 in the reduced image size may be displayed by the display unit 45, the rectangular area may be moved in response to the input operation of the cursor key, and the position of the rectangular area when the reference area setting key is input may be set as the position of the reference area PA in the whole image P2.

Further, a rectangular area having the same size as the reference area PA is set in the whole image P2, and the rectangular area is moved in response to the entry of the cursor key and an image within the rectangular area is displayed by the display unit 45. Then, the position of the rectangular area when the reference area setting key is entered may be set as the position of the reference area PA.

The drive control unit 464A allows the display unit 45 to display the image extracted by the image processing unit 463A. Thereby, if the current visual direction coincides with the reference visual direction, the image (first image) within the reference area PA is displayed in the whole image P2 and, if the current visual direction does not coincide with the reference visual direction, the image (second image) in response to the current visual direction is displayed in the whole image P2. Thereby, the user may visually recognize the image within a partial area of the whole image P2. In this regard, the size of the first image and the size of the second image are the same, and the viewing angle when observing the first image and the viewing angle when observing the second image in the field of view of the user may be made substantially the same.

Note that, when the area set in response to the current visual direction is contained in the whole image fitted in the virtual display surface, the drive control unit 464A allows image formation by the image formation unit 451 and sets the shutter 453 to the shield state, and thereby, improves visual recognition of the displayed image.

On the other hand, when the area set in response to the current visual direction is not contained in the whole image, the drive control unit 464A regulates the image formation by the image formation unit 451 and sets the shutter 453 to the transmission state. Thereby, the user may observe the outside world (around the current location).

According to the HMD 5 of the above-described embodiment, the same advantageous effects as those of the above-described image display system 1 may be provided, and further, there are the following advantageous effects.

By the HMD 5 worn by the user, the image within the area in response to the current visual direction of the user in the whole image may be displayed alone. Accordingly, the display 3 is not essential and the device may be formed at a low price as a display device used by a single user.

Modifications of Embodiments

The invention is not limited to the above-described embodiments, but the invention includes modifications, alterations, etc. within a range in which advantages of the invention may be achieved.

In the first embodiment, the direction in which the user US faces the image display area 31 of the display 3 is set as the reference visual direction, however, the invention is not limited to that. For example, when the display 3 is used as an auxiliary display device, the main visual direction of the user may be used as the reference visual direction.

In the first and second embodiments, the drawing and extracting unit 24 and the image processing unit 463 draw the whole images based on the image data, however, the invention is not limited to that. For example, the whole image may be acquired from the memory unit 23, 48, the above-described memory media, the servers on the network, or the like and the first image and the second image may be extracted from the whole image. That is, it is not necessary that the extracting unit according to the invention has the drawing function of drawing the whole image. Further, it is not necessary that the whole image is the entire image for one frame, but an image contained in the image for one frame (i.e., an image within a predetermined area in the image for one frame) may be used as the whole image.

In the respective embodiments, the drawing and extracting unit 24 and the image processing unit 463A draw the images for one frame as the whole images P1, P2. The contents of the whole image may be different in each of a plurality of areas formed by division of the whole image and may contain lines and marks for partitioning of the respective areas. For example, the whole image may be a whole image in which an image within the reference area PA is an image of a work of art and an image including information of comments on the work of art or the like is set outside of the reference area PA. That is, as described above, the contents are not considered as long as the whole image is contained in the image for one frame. Further, the whole image may be apart of an image for one frame contained in moving image data. In this case, the contents of the whole image are updated with respect to each frame.

In the first embodiment, the displacement detecting unit 42 that detects the direction of displacement and the amount of displacement of the visual direction, the position detecting unit 43 that detects the position of the image display area 31 by detecting the markers 32, and the ranging unit 44 that measures the relative distance from the image display area 31 are provided in the HMD 4, and the displacement detecting unit 42 is provided in the HMD 5 in the second embodiment, however, the invention is not limited to those. That is, the respective detecting units may have configurations worn by the user separately from the HMD 4, 5 or not worn by the user. For example, the ranging unit 44 that measures the relative distance between the image display area 31 and the HMD 4 may be provided in the display 3, or may detect the intensity of the signal transmitted from the HMD to detect the position of the user or detect the relative distance. Further, the configurations of the respective units 41 to 44 are not considered as long as they may appropriately detect their detection targets. In addition, if a configuration of setting the reference visual direction by the input operation of the user is employed, the position detecting unit 43 is not essential, and, if the distance between the display 3 and the user is set in advance, the ranging unit 44 is not essential. In the case where the viewing angle at which the image display area 31 is located is detected and acquired in the field of view of the user based on the detection result of the position detecting unit 43, the ranging unit 44 is dispensable.

In the first embodiment, the whole image P1 is fitted in the virtual display surface VD having the circular shape around the user US in the plan view, the current visual direction is shown by the positive or negative angle with respect to the reference visual direction, and the second image P12 in response to the current visual direction is displayed in the HMD 4. In this regard, it is not necessary that the angle showing the current visual direction is in the ±180° around 0°, and the second image P12 in response to the current visual direction beyond the range may be extracted.

For example, in the image display system 1, when the user rotates one revolution in the right direction from the state in which the current visual direction is directed to the reference visual direction, i.e., suppose that the current visual direction when the current visual direction is directed to the reference visual direction is 0°, when the current visual direction is displaced to +360°, an image in an area further apart from the reference area PA than the area extracted from the whole area P1 when the current visual direction is displaced to +180° may be extracted as the second image. The same applies to the case where the current visual direction is at a negative angle, and the same applies to the HMD 5 according to the second embodiment. Thereby, the user changes the visual direction, and thereby, may observe even a whole image spreading to infinity.

Note that, in the image display system 1 shown in the first embodiment, when the area set in response to the current visual direction is outside of the whole image fitted in the virtual display surface VD, the image transmitter 2 does not perform extraction and transmission of the second image and the HMD 4 sets the shutter 453 to the transmission state to enable observation of the outside world like the HMD 5 shown in the second embodiment. On the other hand, in this case, the image transmitter 2 may generate and transmit an image different from the whole image (e.g., a black image or an image containing a predetermined message) so that the HMD 4 may display the image.

In the first embodiment, the virtual display surface VD has the circular shape as seen from above, and, in the second embodiment, the virtual display surface has the semispherical shape covering above the head of the user, however, the invention is not limited to those. For example, a virtual display surface VD having a flat surface shape may be set. In this case, if the current visual direction coincides with the reference visual direction, the displayed image may be a rectangular image and, if the current visual direction is different from the reference visual direction, shape correction processing of providing a sense of depth may be performed on the image extracted from the whole image.

For example, as the current visual direction separates from the reference visual direction, shape correction processing of providing an image having a shape with an edge opposite to the reference area side formed to be smaller than an edge at the reference area side may be performed. According to the processing, a condition in which a continuous image is displayed on the flat virtual display surface may be represented. Note that the virtual display surface may be selected by the user. In this case, when a spherical virtual display surface is selected, the radius of curvature of the spherical surface may be selected or input. In addition, the relative distance between the user and the virtual display surface may be selected or input.

Note that the virtual display surface VD is set with respect to each user, however, not limited to that. A virtual display surface VD common to the respective users may be set. In this case, the virtual display surface VD may be set around a predetermined position within the space in which the users are located.

In the respective embodiments, the HMDs 4, 5 have configurations of guiding the image formed by the image formation unit 451 to the eye of the user while reflecting the image within the light guide member 452 for visual recognition of the image. However, the invention is not limited to that. The light guide member that allows light to travel while reflecting the light is not necessarily used as long as a member may guide the image to the eye of the user. For example, a configuration in which the light from the image formation unit 451 is directly reflected on a reflection film provided in response to the eye of the user and the image formed by the light is visually recognized may be employed. Further, a retina projection (laser retina projection)-type HMD of directly projecting image light on a retina for recognition of an image in response to the image light may be employed.

In the respective embodiments, the image formation unit 451 forming the display unit 45 includes the light source, the light modulator, and the projection optical unit. However, the invention is not limited to that. For example, in place of the light source and the light modulator, a panel including a self-emitting device such as organic EL or plasma may be employed.

In the first embodiment, the HMD 4 worn on the head of the user is employed as the second display device, however, the invention is not limited to that. That is, the second display device may be an image display device following the change of the attitude of the user and, for example, may be a display fixed to the user or a display fixed to a chair on which the user sits. In this case, the displacement detecting unit detects the direction of displacement and the amount of displacement of the orientation of the body, and thereby, the visual direction acquisition unit may acquire the visual direction information representing the current visual direction. Further, as the first display device, as described above, not only various displays of liquid crystal, plasma, organic EL, CRT, etc. but also a projector that projects an image on a projected surface of a screen or the like and displays the image may be employed.

The invention may be preferably used for an image display device worn on a head and an image display system having the image display device, for example.

The entire disclosure of Japanese Patent Application No. 2013-048246, filed Mar. 11, 2013 is expressly incorporated by reference herein.

What is claimed is:

1. An image display system comprising:
an image transmitter;
a first display device that displays a first image received from the image transmitter;
a second display device that is a see-through head-mounted display device worn on a head of a user and that displays a second image received from the image transmitter; and
a virtual display surface surrounding the user on which a whole image is displayed,
the second display device including:
a display device side reception unit that receives the second image,
a display unit that displays the received second image,
a visual direction acquisition unit that acquires a current visual direction of a user relative to the first display device, and
a display device side transmission unit that transmits the acquired current visual direction, and
the image transmitter including:
a transmitter side reception unit that receives the current visual direction from the second display device,
an extraction unit that extracts as the first image an image of a partial area in the whole image corresponding to the image displayed on the first display device and extracts as the second image an image of a second partial area of the whole image corresponding to the current visual direction of the user, and
a transmitter side transmission unit that transmits the first image and the second image,
wherein
when the current visual direction of the user is directed toward the first display device, a drive control unit in the second display device opens a shutter to allow transmission of outside light from the first image displayed on the first display device through the second display device to be viewed by the user, and
when the current visual direction of the user is in a direction other than a direction directed toward the first display device, the drive control unit in the second display device closes the shutter to shield outside light from transmitting through the second display device such that the second image is visible without interference from outside light.

2. The image display system according to claim 1, wherein the visual direction acquisition unit shows the current visual direction as an angle with respect to a reference visual direction as a direction in which the visual direction of the user is directed to the first display device.

3. The image display system according to claim 2, wherein the second display device includes a displacement detection unit that detects displacement of the visual direction of the user, and
the visual direction acquisition unit acquires the current visual direction based on an amount of displacement of the visual direction from the reference visual direction detected by the displacement detection unit.

4. The image display system according to claim 2, wherein the second display device has a position detection unit that detects a position of the first display device, and
the visual direction acquisition unit uses the visual direction of the user when the position of the first display device is detected by the position detection unit as the reference visual direction.

5. The image display system according to claim 1, wherein the second display device includes a see-through head-mounted display device worn on a head of the user,
the display unit includes
an image formation unit that forms the second image,
a light-transmissive light guide member that guides the second image formed by the image formation unit to an eye of the user and transmits outside light, and
a shutter that is provided outside of the light guide member and controls incidence of the outside light to the eye of the user, and
the second display device has a drive control unit that operates the shutter to shield the outside light if the current visual direction is not a direction toward the first display device, and operates the shutter to transmit the outside light if the current visual direction is the direction toward the first display device.

6. The image display system according to claim 5, wherein the second display device has an image processing unit of resizing the received second image to substantially the same size as an apparent size of the first image observed by the user when the current visual direction is directed to the first display device.

7. The image display system according to claim 6, wherein the first display device has an image display area for displaying the first image,
the second display device includes a size detection unit that detects an apparent size of the image display area from the user, and
the image processing unit resizes the second image in response to the apparent size of the image display area detected by the size detection unit.

8. A head-mounted display device worn on a head of a user comprising:
a displacement detection unit that detects displacement of a visual direction of the user;

an image acquisition unit that acquires an image of a partial area of a whole image displayed on a virtual display surface surrounding the user in response to the displacement of the visual direction detected by the displacement detection unit with reference to a preset area in the whole image; and a display unit that displays the image acquired by the image acquisition unit, wherein when the visual direction of the user is directed toward an external display device that displays a first image, a drive control unit in the head-mounted display device opens a shutter to allow transmission of outside light from the image displayed on the external display device through the head-mounted display device to be viewed by the user, and when the visual direction of the user is in a direction other than a direction directed toward the external display device, the drive control unit in the head-mounted display device closes the shutter to shield outside light from transmitting through the head-mounted display device such that the first image is visible without interference from outside light.

9. The image display system according to claim 2, wherein the angular displacement of the second partial area from the first partial area is substantially the same as the angular displacement of the current visual direction from the reference visual direction.

* * * * *